H. A. MEINECKE.
APPARATUS FOR PRESERVING AND RIPENING BANANAS.
APPLICATION FILED NOV. 15, 1916.

1,238,550.

Patented Aug. 28, 1917.

INVENTOR
Herman A. Meinecke
by Hazard and Miller
ATTYS.

UNITED STATES PATENT OFFICE.

HERMAN A. MEINECKE, OF LOS ANGELES, CALIFORNIA.

APPARATUS FOR PRESERVING AND RIPENING BANANAS.

1,238,550.  Specification of Letters Patent.  Patented Aug. 28, 1917.

Application filed November 15, 1916.  Serial No. 131,595.

*To all whom it may concern:*

Be it known that I, HERMAN A. MEINECKE, a citizen of the United States, residing at Los Angeles, in the county of Los Angeles and State of California, have invented new and useful Improvements in Apparatus for Preserving and Ripening Bananas, of which the following is a specification.

My invention relates to an apparatus for preserving and ripening bananas on the stem.

As well known, bananas are raised in tropical climates and are harvested in an unripe or green condition. They are usually still green or unripe when they reach the retailer and the bananas gradually ripen on the stem and are sold as they ripen.

The flavor of the bananas picked in a green state and ripened subsequently on the stem is inferior to the bananas that ripen naturally on the plant. One of the principal reasons therefor is the fact that the bananas during the ripening period require considerable quantities of water for the proper metabolism occurring within the banana, which changes the starch thereof into fruit sugar and various other organic compounds.

I have discovered a simple and efficient method, whereby the water necessary for the proper ripening process of the bananas is supplied thereto, and a simple apparatus for carrying out the process.

In the accompanying drawings which form a part of this specification, I have illustrated my apparatus used for carrying out the process and its application to a bunch of bananas to be ripened, and in which.

Figure 1:
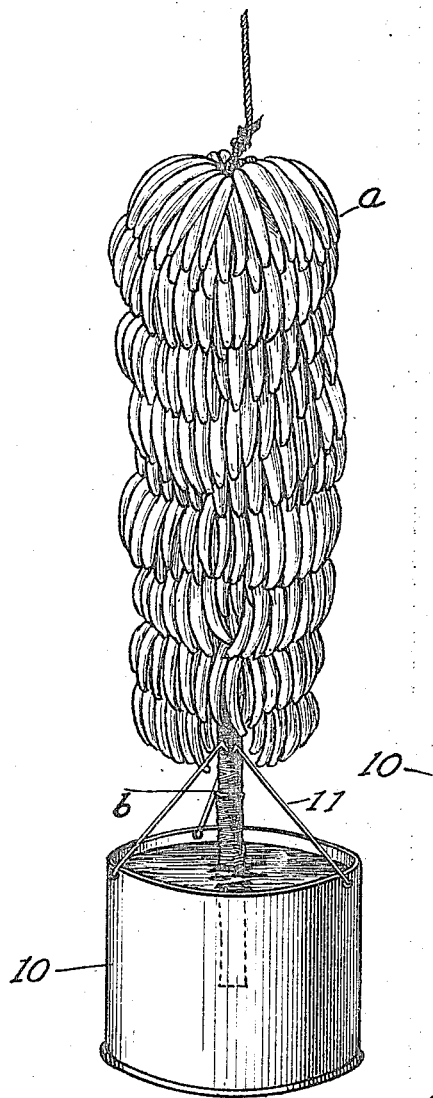
Figure 1 is a perspective view of a bunch of bananas to which my apparatus is applied.
Figure 2:
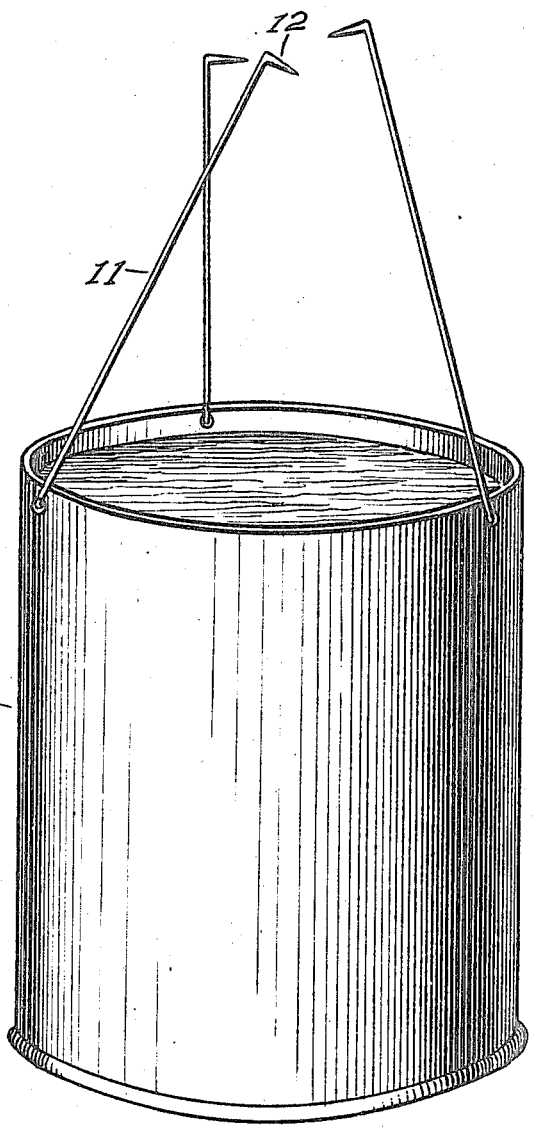
Fig. 2 is a perspective view on an enlarged scale of my apparatus detached from the bunch of bananas.

Referring to the drawings, a bunch of bananas A, having a stem B is suspended from any suitable support (not shown). A liquid container 10 which may have the shape of a cylindrical can open at the top, is attached to the stem B by means of a plurality of attaching hooks or arms 11. I have shown three in number, although it will be understood that the number is immaterial. These arms 11 are pivoted at their lower ends to the upper end of the side walls of the can 10 and are provided at their upper ends with bent and pointed portions or hooks 12 adapted to be inserted into the stem B of the bananas.

In the application of the apparatus, the same is filled with water and the stem of the bananas is inserted therein. The lower end of the stem should be cut off above any dried portions thereof and the cut should present a smooth surface so that the absorption of the water by the bananas through osmose will be facilitated. The hook portions 12 of the attaching arms 11 are fastened to the stem whereby the can 10 is suspended as shown in Fig. 1. The quantity of water taken up by the bananas is really remarkable and the can needs refilling from time to time. The bananas ripen in a degree not hitherto attained where my method is not used. The flavor is superior due to the fact that the moisture required by metabolism of the ripening process is supplied as needed. The loss from dried, shriveled and unsalable bananas is practically eliminated by my method.

I claim:

1. An apparatus for ripening bananas on the stem, comprising a vessel adapted to contain water and to receive the end of said stem, a plurality of fastening arms pivoted to said vessel and swinging upwardly and inwardly therefrom, and means for removably securing the upper ends of said arms to said stem to suspend said vessel therefrom.

2. An apparatus for ripening bananas on the stem, comprising a vessel adapted to contain water and to receive the end of said stem, a plurality of fastening arms pivoted to said vessel and swinging upwardly and inwardly therefrom, and hooks on said arms whereby the arms may be removably attached to said stem to suspend said vessel therefrom.

In testimony whereof I have signed my name to this specification.

HERMAN A. MEINECKE.

Copies of this patent may be obtained for five cents each, by addressing the "Commissioner of Patents, Washington, D. C."